United States Patent [19]

Eisemann

[11] 3,884,481

[45] May 20, 1975

[54] DEVICE FOR LIFTING AND LOWERING A PICK-UP ARM OF A RECORD PLAYER

[75] Inventor: Kurt Eisemann, Berlin, Germany

[73] Assignee: U.S. Philips Corporation, New York, N.Y.

[22] Filed: Sept. 18, 1973

[21] Appl. No.: 398,485

[30] Foreign Application Priority Data

Oct. 6, 1972 Germany............................ 2249178

[52] U.S. Cl................................................ 274/23 R
[51] Int. Cl. ............................................ G11b 3/00
[58] Field of Search ......................... 274/10 R, 23 R

[56] References Cited

UNITED STATES PATENTS 3,450,410 6/1969 Castagna........................... 274/23 R
3,717,350 2/1973 Oakley et al...................... 274/23 R

*Primary Examiner*—Richard E. Aegerter
*Assistant Examiner*—Steven L. Stephan
*Attorney, Agent, or Firm*—Frank R. Trifari

[57] ABSTRACT

A device for lifting and lowering a pick-up arm of a record player, comprising a plastic injection-molded tipping lever, integrally molded with a handle at one end, a mounting portion, and a lifting pin at the other end. The handle, mounting and pin are connected to the lever by film-type joints.

1 Claim, 3 Drawing Figures

DEVICE FOR LIFTING AND LOWERING A PICK-UP ARM OF A RECORD PLAYER

The invention relates to a device for lifting and lowering a pick-up arm of a record player with the aid of a lifting pin and a tilting actuating handle, the tilting movement of the handle being converted into the lifting movement by means of a two-armed lever which can be tilted about an axis. The lever ends co-operate with the actuating handle and the lifting tin respectively, and the lever is pivoted to the underside of the mounting plate.

The scanning system, the scanning stylus or a gramophone record to be played may be damaged when the stylus not lowered gently onto the record. Moreover, inadventent lateral movements of the pick-up arm as it is lowered or lifted may damage the stylus, the scanning system and the record. In order to obviate said drawbacks devices are known by means of which the pick-up arm can be lowered onto or lifted off the record via a manually operated handle. Only when the stylus or the scanning system is no longer in contact with the record is the arm guided by the fingers of the user. The known devices consist of a two-armed tipping lever, of which the free end of the one arm co-operates with the lifting pin, whilst the handle which is pivoted on the mounting plate operates the free end of the other arm of the tipping lever. The tipping lever itself is mounted by means of a bearing which is located on the mounting plate and has a bearing shaft, rings and a split pin. Consequently, this known lifting device alone requires a great number of bearing parts for the tipping lever, which have to be manufactured and mounted separately.

It is an object of the invention to reduce the number of parts required and to simplify mounting.

According to the invention this achieved in that at the location of the pivot a bearing part is molded on the plastic molded lever by means of a film-type joint. The part can be pressed into a recess at the underside of the mounting plate to mount the tipping lever.

In order to further simplify the construction of the lifting device, according to a preferred embodiment of the invention the lifting pin is molded on the free end of the lever arm which co-operates with the lifting pin, the connection between the lever arm and the pin consisting of a film-type joint formed during molding. An additional advantage of this is that the pin is automatically taken along.

The known attachment of the handle by means of a bearing shaft, rings and split pin is also expensive. Therefore, in an advantageous embodiment of the invention the handle is connected to the free end of the associated lever arm via a film-type joint and is provided with a guide member. When the handle is tilted about a horizontal axis the guide member rolls along the mounting plate and thus presses the point connecting handle and film joint away from the mounting plate. By molding on the handle simultaneously conventional bearing parts and mounting time are saved.

To return the parts associated with the device to the initial positions when the lifting pin is lowered, in a preferred embodiment of the invention the lifting pin is guided in a bushing which is provided on the mounting plate, in which a compression spring is fitted on the lifting pin, which returns the pin and with it the two-armed tipping lever and the handle to their starting positions.

A particular advantages of the invention is that the movable parts of the device are constituted by a single plastic component obtained by injection molding.

As the device is mounted on the mounting plate without screws, assembly costs during manufacture and in the event of repairs are reduced.

The invention will be described in more detail with reference to the embodiments shown in the drawings.

Figure 1:
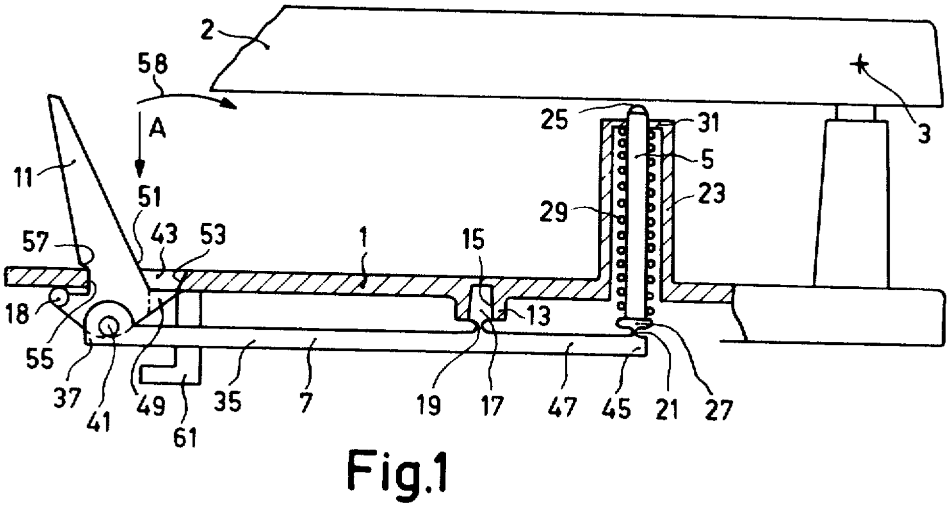
FIG. 1 is a part sectional view of a lifting device for a pick-up arm with a tipping lever bearing according to the invention.

A pick-up arm 2 is pivotable in a vertical plane by means of a bearing 3 on a mounting plate of a record player 1. The pick-up arm 2 can be lifted manually or by means of a lifting device, which presses against the underside of the pick-up arm 2 with a lifting pin 5. The lifting device consists of a two-armed tipping lever 7, which is pivoted to the mounting plate 1, and of a handle 11 and the lifting pin 5. For mounting purposes, a boss 13 is molded at the underside of the molded plate 1, which has a recess 15. The tipping lever 7 is a moulded, plastic part, on which a mounting part 17 and the lifting pin 5 are molded. The mounting part 17 corresponds to the shape of the recess 15 and is dimensioned so that after it is pressed into the recess 15 it is retained therein. The connection between the mounting part 17 and the tipping lever 7 is formed by a film-type joint 19, which permits tilting about the axis of the joint.

The lifting pin 5 is also connected to the tipping lever 7 by means of a film-type joint 21. A sleeve 23, which is vertically disposed on the mounting plate, serves to guide the lifting pin 5, said sleeve and the mounting plate 1 being obtained by injection molding. The lifting pin 5 protrudes from the underside of the mounting plate 1 through the sleeve 23 and can abut the pick-up arm 2 with its upper end 25.

The lifting pin 5 has a collar 27 at its lower end which is provided with the film joint 21, on which collar a compression spring 29 bears. The compression spring 29 extends upwards around the lifting pin 5 between the sleeve 23 and said pin and bears with its upper end on a constriction 31 at the upper sleeve opening. The spring 29 is pretensioned and ensures that the lifting pin 5 is lowered in the sleeve 23 in the rest position.

Figure 2:
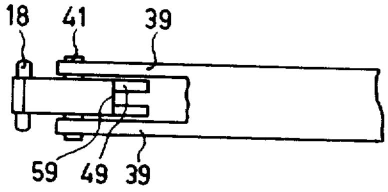
FIG. 2 is a view in the direction of the arrow A in FIG. 1, of a bearing between the handle and the two-armed tipping lever, in which the mounting plate has been omitted.

Actuation of the lifting pin 5 and the tipping lever 7 is effected via the lever arm 35 of the two-armed tipping lever 7 which is located at the left in the drawings. The free end 37 of said lever arm 35 is forked (FIG. 2). Through the fork arms 39 of the lever arm 35 a bearing pin 41 extends which is molded on the handle 11, pivotally supporting the handle 11. The handle 11 protrudes through a opening 43 in the mounting plate 1 and can be manually operated from the top. The handle 11 is provided with a guide member 18, which rests against the underside of the mounting plate. When the handle 11 is tilted the guide member 18 rolls down along the underside of the mounting plate 1, the handle 11 pressing the bearing pin 41 downwards. Consequently, the end 37 of the lever arm 35 is also tilted downwards. Simultaneously the free end 45 of the other arm 47 of the two-armed lever 7 is raised, so that the lifting pin 5 is lifted out of the sleeve 23 and strikes against the pick-up arm 2.

The handle 11 is provided with stops in order to limit the tilting movement. Two of such stops form legs 49, which, viewed from the bearing pin 41, are located opposite the guide member 18. In the rest position the legs 49 engage the underside of the mounting plate 1. Moreover, erroneously pressing down the handle 11 through the mounting plate is prevented, because the handle 11 engages the left edge 55 of the opening 43. For this purpose the handle 11 is provided with a recess 57 receiving the edge 55 in the rest position.

When the handle 11 is moved to the right in the direction of the arrow 57, the free end 37 of the lever arm 35 being lowered, the side 51 of the handle will engage the right-hand edge 53 of the opening 43. Moreover, a side 59 of the handle between the legs 49 butts against a perpendicular rib 61 of the mounting plate 1. Thus, not only the tilting movement of the handle 11 is limited, but also its downward travel.

Figure 3:
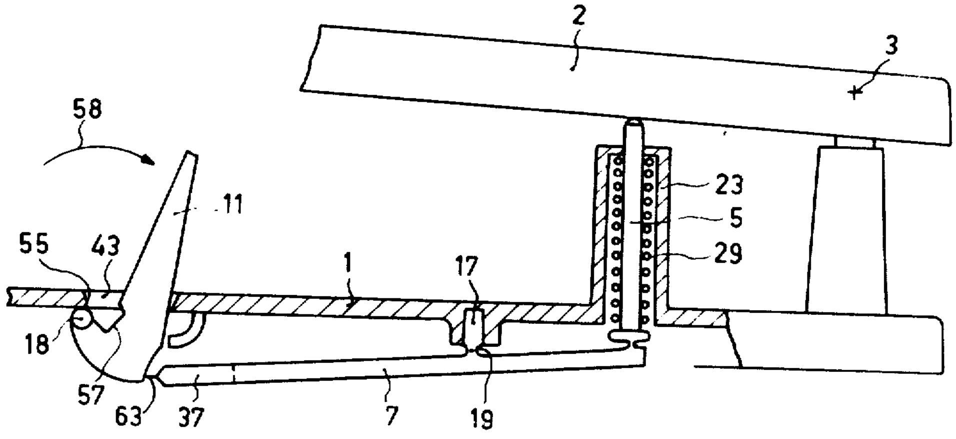
FIG. 3 is a view partly in section of another embodiment according to the invention with a handle connected via a film-type joint.

In the embodiment of FIG. 3 a further simplification of the lifting device is shown, i.e., the handle 11 is manufactured together with the tipping lever 7 and the lifting pin 5 in a single injection moulding operation. The connection between the tipping lever 7 and the handle 11 is formed by a film-type joint 63. Thus, the bearing pin 41 of the associated bearing between the handle 11 and the tipping lever 7 is also eliminated. The further movements for lifting and lowering correspond to those of the embodiment of FIGS. 1 and 2. The complete lifting device can be mounted in one operation and can be secured in the mounting plate 1 by means of the mounting part 17.

What is claimed is:

1. A device for lifting and lowering a pick-up arm of a record player of the type comprising a tilting handle means for manually actuating the device and an integral lowering and lifting pin, said device comprising a plastic molding having a two-armed lever portion, a mounting portion connected to said lever portion by a film-type joint, a lifting pin portion connected to said lever portion by a filmtype joint at a first end of the lever, and a tilting handle means portion connected to said lever by a film-type joint at an end of the lever opposite to said first end.

* * * * *